United States Patent
Goel et al.

(10) Patent No.: US 10,236,656 B2
(45) Date of Patent: Mar. 19, 2019

(54) SHARED OPTICAL PUMPS AMONG MULTIPLE FIBER CHANNELS

(71) Applicant: Facebook, Inc., Menlo Park, CA (US)

(72) Inventors: Nitin Kumar Goel, Mountain View, CA (US); Satyajeet Singh Ahuja, Cupertino, CA (US); Gayathrinath Nagarajan, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/681,292

(22) Filed: Aug. 18, 2017

(65) Prior Publication Data
US 2019/0058301 A1  Feb. 21, 2019

(51) Int. Cl.
| | |
|---|---|
| *H01S 3/094* | (2006.01) |
| *H04J 14/02* | (2006.01) |
| *H04B 10/25* | (2013.01) |
| *H01S 3/23* | (2006.01) |
| *H01S 3/30* | (2006.01) |
| *H01S 3/16* | (2006.01) |

(52) U.S. Cl.
CPC .. *H01S 3/094061* (2013.01); *H01S 3/094046* (2013.01); *H01S 3/2308* (2013.01); *H01S 3/2383* (2013.01); *H01S 3/302* (2013.01); *H04B 10/2504* (2013.01); *H04J 14/0221* (2013.01); *H01S 3/1608* (2013.01)

(58) Field of Classification Search
CPC ............... H01S 3/094061; H01S 3/302; H01S 3/094046; H01S 3/2383; H01S 3/2308; H01S 3/1608; H04J 14/0221; H04B 10/2504

See application file for complete search history.

(56) References Cited

U.S. PATENT DOCUMENTS

| | | | | |
|---|---|---|---|---|
| 6,222,668 | B1 * | 4/2001 | Dutrisac | H04B 10/077 359/337 |
| 2001/0050804 | A1 * | 12/2001 | Chung | H01S 3/06754 359/341.2 |
| 2002/0067538 | A1 * | 6/2002 | Sugaya | H01S 3/06758 359/337.12 |

(Continued)

OTHER PUBLICATIONS

Non-Final Office Action dated Dec. 29, 2017 for U.S. Appl. No. 15/375,021 by Goel, N., et al., filed Dec. 9, 2016.

(Continued)

*Primary Examiner* — David C Payne
*Assistant Examiner* — Omar S Ismail
(74) *Attorney, Agent, or Firm* — Van Pelt, Yi & James LLP

(57) ABSTRACT

Aspects of an optical communications network are described that include two or more optical fibers arranged to allow communication in the same direction. The optical network includes a first optical amplifier coupled to the first optical fiber, a second optical amplifier coupled to the second optical fiber, a first optical pump to provide optical power to the first optical fiber, and a second pump to provide optical power to both the first and the second optical fibers. By sharing the second pump between the first and the second optical fibers, a need to deploy additional pumps is alleviated. Scaling of the optical network to include additional optical fibers provides further cost savings by allowing more pumps to be shared among the multiple optical fibers.

20 Claims, 3 Drawing Sheets

(56) References Cited

U.S. PATENT DOCUMENTS

| | | | | |
|---|---|---|---|---|
| 2003/0048524 | A1* | 3/2003 | Chavez-Pirson | H01S 3/063 359/333 |
| 2003/0194233 | A1* | 10/2003 | Casanova | H04B 10/077 398/2 |
| 2004/0042063 | A1* | 3/2004 | Ohtani | H04B 10/0775 359/341.3 |
| 2004/0047628 | A1* | 3/2004 | Passier | H04B 10/077 398/15 |
| 2004/0070819 | A1* | 4/2004 | Farley | H01S 3/1301 359/341.4 |
| 2007/0024957 | A1* | 2/2007 | Charlet | H04B 10/2916 359/334 |
| 2007/0292130 | A1* | 12/2007 | Pegg | H04B 10/071 398/20 |
| 2010/0209117 | A1* | 8/2010 | Chang | H01S 3/094061 398/175 |
| 2010/0284063 | A1* | 11/2010 | Campanelli | G01M 11/3154 359/341.3 |
| 2014/0161449 | A1* | 6/2014 | Doerr | H04J 14/0257 398/49 |
| 2014/0268308 | A1* | 9/2014 | Pelouch | H01S 3/302 359/334 |
| 2016/0036552 | A1* | 2/2016 | Li | H04J 14/0265 398/49 |

OTHER PUBLICATIONS

U.S. Appl. No. 15/375,021 by Goel, N., et al., filed Dec. 9, 2016.
U.S. Appl. No. 15/607,113 by Goel, N. et al., filed May 26, 2017.
U.S. Appl. No. 15/647,191 by Goel, N. et al., filed Jul. 11, 2017.

* cited by examiner

SHARED OPTICAL PUMPS AMONG MULTIPLE FIBER CHANNELS

BACKGROUND

Social networking systems enable a very large number of users (e.g., a billion users or more) to share data worldwide. To support this data sharing, the social networking systems have multiple data centers that are distributed around the world. The multiple data centers enable the data to be distributed worldwide, e.g., to back up data or to store data near where the data will be consumed. Each of these data centers typically has a very large number of server computing devices. The server computing devices may be assigned various roles, e.g., compute, data storage, web site, etc.

Data centers may be built and geographically located based on various requirements and constraints. Data centers in developed countries can be large, where power and land are available. In countries where power and land are less available or there is a regulation concern, data centers may be smaller. Because larger data centers are easier to manage and provide superior scalability, they are preferred and tend to be built in a handful of locations. On the other hand, for flexibility and nimbleness, small data centers are preferred and they are built in many places wherever there are users of the social networking system. As a result, the infrastructure for a social networking systems may have various sizes of data centers that are geographically dispersed.

Content providers and, e.g., streaming video content providers, similarly build large data centers and can locate them near consumers of their content. They may also use services of content delivery networks to deliver content. These content delivery networks also have geographically dispersed data centers.

To exchange large amounts of data between data centers, the owners or operators of the data centers typically use high speed data communications links between the data centers, e.g., fiber optic communications links. High speed communications links (also referred to herein as "lines"), e.g., fiber optic links, can have two physical communications lines (e.g., fibers) that together form a circuit. One of these lines is typically used to transmit data and the other line is typically used to receive data. This is commonly known as full duplex communications.

DETAILED DESCRIPTION

Figure 1:
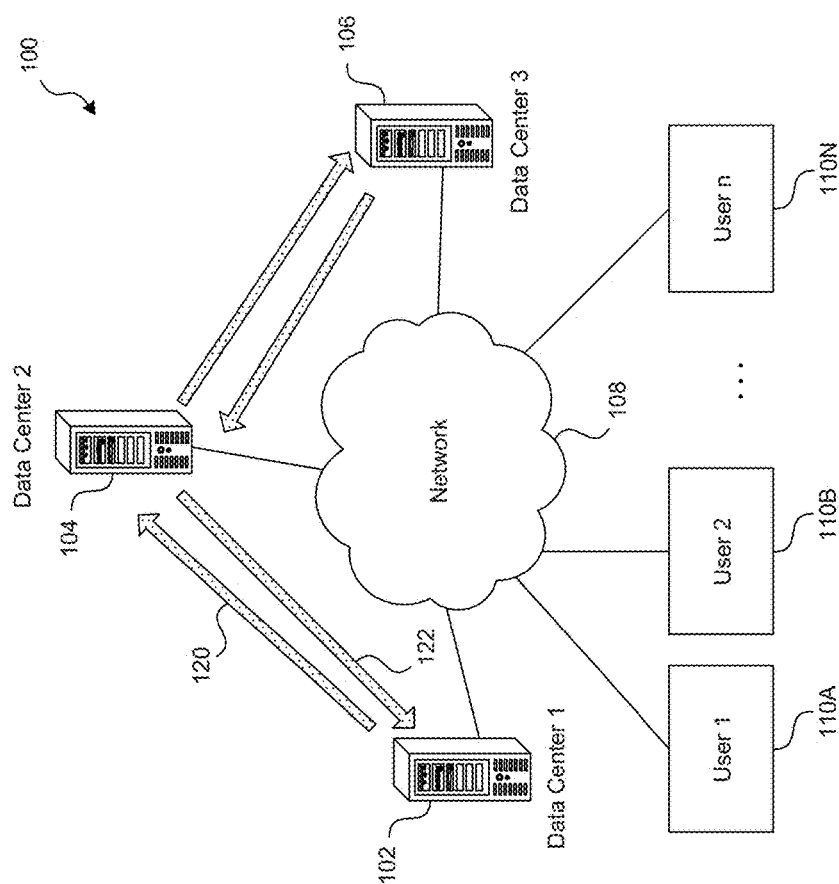
FIG. 1 is a block diagram illustrating an environment in which an optical power management and supply may be employed, consistent with various embodiments.

The disclosed techniques and systems improve and optimize the performance and utilization of communications networks, e.g., a fiber optic network, based on an architecture that shares one or more of the optical pumps amongst multiple optical fiber rails.

In optical communications networks, e.g., fiber optic networks, a transponder can convert or generate various wavelengths of light that is propagated along a fiber optic cable. Various light wavelengths can be used to transmit or receive data. In dense wavelength division multiplexing (DWDM), which is a physical optical layer protocol for exchanging data, multiple "channels" are used to transmit or receive data in parallel on a single fiber or on two fibers ("fiber pair").

In conventional systems, each optical link is typically powered by at least one erbium-doped fiber amplifier (EDFA), which can provide amplification in the forward direction (i.e., in the direction of data flow). In its basic form, an EDFA includes a Erbium-doped fiber (typically of length 20 meters) a pump laser (e.g., 980 nm or 1480 nm) and a WDM component for combining the pump signal with the DWDM signal. This configuration can be augmented by deploying a Raman amplifier to inject power into the optical link downstream. It is readily understood that Raman amplifiers (i.e., distributed Raman amplifiers) use the transmission medium itself as the medium into which the backward Raman pump is injected to provide amplification of optical signals traversing the optical medium. An optical pump for a Raman amplifier can operate at, for example, 1530 nm, while providing amplification for signals carried in other ranges of wavelengths, such as in 1545 to 1555 nm range. The combination of the EDFA and the downstream Raman amplifier can operate to lower the required power that needs be launched into transmission medium by each pump and/or increase the distance at which additional amplification of the optical signal becomes necessary. In addition to the main pumps used for EDFA and Raman amplifiers, fiber communication systems further utilize redundant or auxiliary pumps to improve the reliability of the fiber communication network, for example, in the event that the main pumps fail. As such, each fiber link, or each span of the fiber link, can potentially use two EDFAs and two Raman pumps.

With proliferation of media distribution and information sharing needs amongst a variety of geographically diverse consumers and distributors, bandwidth capacity of optical links (e.g., a single pair of optical fibers) may be exhausted, thus necessitating the deployment of additional fiber links in each direction, which in turn, increases the number of deployed optical pumps. For example, increasing the number of fiber rails from one to two (in each transmission and reception directions), can increase the number of pumps from four to as much as eight.

The systems and configurations that are described in detail below provide power sharing configurations that reduce the number of optical pumps needed for networks that use multiple fibers for communication in the same direction.

One aspect of the disclosed technology relates to an optical communication network that includes a first node coupled to a first optical channel and to a second optical channel. The first optical channel is formed as part of a first optical fiber and the second optical channel is formed as part of a second optical fiber. The optical communication network also includes a second node coupled to the first optical channel and to the second optical channel and configured to receive optical signals from the first node through both the first and the second optical channels. The optical communication network further includes a first optical amplifier coupled to the first optical fiber, and a second optical amplifier coupled to the second optical fiber. The above noted optical communication network additionally includes a coupler having an input coupled to a first optical pump, a first output couple to the first optical amplifier, and a second output coupled to the second optical amplifier. Additionally, the optical communication network includes the first pump coupled to the coupler to provide optical power to the first optical fiber, and a second pump coupled to the coupler to provide optical power to both the first and the second optical fibers.

In one example embodiment, the optical communication network further includes a third pump to provide power to the second optical fiber. In one example embodiment, the first and the third pumps are configured to operate as main optical pumps and the second pump is configured to operate as a redundant pump. In one example embodiment, the first optical amplifier is an EDFA. Further, the optical communication network can be configured to operate in a wavelength range of 1530 to 1565 nm.

In one example embodiment, the second pump is a Raman pump configured to inject optical power into both the first optical fiber and the second optical fiber in a reverse direction pointing from the second node to the first node. In one example embodiment, one or both of the first or the second pumps operate at a nominal wavelength of 980 nm.

In one example embodiment, the optical communication network further includes a third optical fiber including a third optical channel, where the second node is configured to receive optical signals from the first node through the first optical channel, the second optical channel and the third optical channel. In this embodiment, the optical communication network further includes a fourth pump configured to provide optical power to the third optical fiber as a main pump, and a fifth pump configured to operate as a redundant pump. The fifth pump is configured to provide optical power to the second and to the third optical fibers.

In one example embodiment, the optical communication network further includes a computing device including one or more processors and non-transitory computer readable media for storing processor executable instructions. In one example embodiment, the optical communication network further includes an additional optical fiber configured to enable communications from the second node to the first node.

Another aspect of the disclosed technology relates to an optical power arrangement for use in a fiber optical communication network that includes a first and a second optical fiber both configured to communicate data in a first direction, a first optical pump coupled to the first optical fiber and a second optical pump coupled to the second optical fiber. The optical power arrangement further includes a third optical pump coupled to both the first and the second optical fibers to enable delivery of power to both the first and the second optical fibers, where the third optical pump is a Raman pump configured to inject optical power into both the first and the second optical fibers in a second direction opposite to the first direction.

In one example embodiment, optical power arrangement also includes one or more couplers configured to couple optical power from the first, the second or the third optical pumps to one or both of the first or the second optical fibers. The optical power arrangement can also include a first optical amplifier coupled to the first optical fiber and configured to receive optical power from the first optical pump and to enable amplification of optical signals in the first direction.

In one exemplary embodiment, the optical power management includes a second optical amplifier coupled to the second optical fiber and configured to receive optical power from the second optical pump and to enable amplification of optical signals in the first direction. In one exemplary embodiment, each of the first and the second optical amplifiers is an EDFA. In one exemplary embodiment, the optical power management is configured to operate in a wavelength range of 1530 to 1565 nm. In one exemplary embodiment, the optical power arrangement also includes an additional optical fiber configured to enable communications in the second direction.

Environment

Turning now to the figures, FIG. 1 is a block diagram illustrating an environment 100 in which the direction-switchable transponder may operate. One or more data centers 102, 104, and 106 may be interconnected via a network 108 (e.g., the Internet). Users, e.g., users 110A, 1106, and 110N, may access data stored at the data centers. The data center may respond to the request immediately, may redirect the request to a different data center, or may download the requested data from the different data center and respond to the request. As an example, suppose User 1 110A requests content from a social networking system or a video streaming service. A server that initially receives the request may direct the request to Data Center 1 102 because that data center is geographically located closest to User 1 110A. As is known in the art, by directing user requests to data centers that are geographically located closest to them, the number of network hops can be reduced and further responses can be rapidly communicated to the users. If the requested content is not available at Data Center 1 102, request can be forwarded to a different data center that stores the content, e.g., Data Center 2 104. However, because of the additional network hops between User 1 110A and Data Center 2 104 (as compared to Data Center 1 102), the content may arrive slowly. The user may notice sluggish performance, stops in video, etc. To reduce these issues, Data Center 1 102 may employ high speed communications lines 120 and 122 to quickly download the requested content from Data Center 2 104 and then respond to the user request. The high speed communications lines 120 and 122 can be fiber optic communications lines or indeed any communications lines that offer very high bandwidth and throughput.

Figure 2:
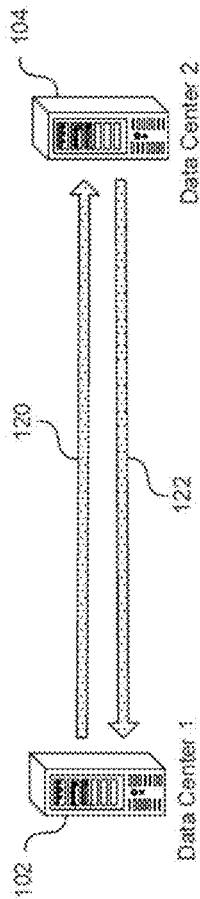
FIG. 2 is a block diagrams illustrating aspects of high speed communications lines, consistent with various embodiments.

FIG. 2 is a block diagram illustrating aspects of high speed communications lines, consistent with various embodiments. According to FIG. 2, Data Center 1 102 is communicably coupled, via high speed communications lines 120 and 122 that together form a circuit, to Data Center 2 104. In some embodiments, the high speed communications lines 120 and 122 may together be a fiber optic communications pair. While in the example block diagrams of FIGS. 1 and 2 high speed communication lines 120 and 122 are shown as connecting the depicted data centers, it is understood that high speed lines can provide connectivity among different devices, such as between data centers and users, or among users.

Figure 3:
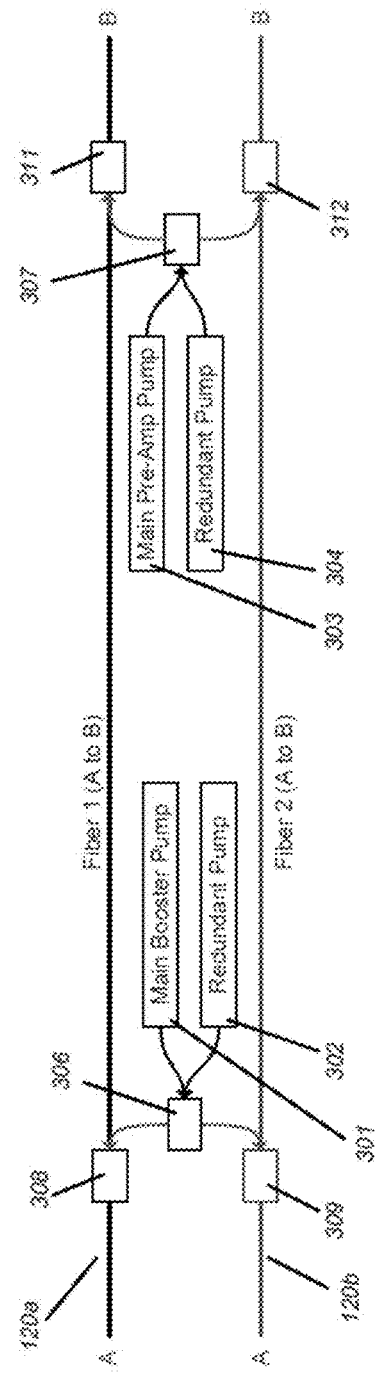
FIG. 3 is a block diagram illustrating aspects of optical power sharing in an optical communication network, consistent with various embodiments.

FIG. 3 is a block diagram illustrating aspects of optical power sharing in an optical communication network, consistent with the disclosed embodiments. FIG. 3 shows two fiber channels or rails identified as Fiber 1 120a and Fiber 2 120b for carrying optical signals from node A to node B. Nodes A and B can, for example, represent different users, data centers, or other entities or devices in an optical communications network. It should be noted that communications from node B to node A is carried out via a second set of fiber channels, which are not depicted in FIG. 3 to avoid clutter. Optical pumps 301 to 304 provide power to Fiber 1 and Fiber 2 at different points in the communication link. In the configuration of FIG. 3, a main booster pump 301 and a first redundant pump 302 feed into a first coupler 306 that drive a first amplifier 308 and a second amplifier 309, while a main pre-amplifier pump 303 and a second redundant pump 304 feed into a second coupler 307 that drive a third amplifier 311 and a fourth amplifier 312. In accordance with an embodiment, the first coupler 306 is configured to enable sharing of the first redundant pump 302 between Fiber 1 and Fiber 2. In some embodiments, the second coupler 307 is configured to enable sharing of the second redundant pump 304 between Fiber 1 and Fiber 2. Thus, in an aspect of the disclosed techniques, a power sharing mechanism is provided to reduce the number of optical pumps in a optical fiber communication network that utilizes more than one fiber channel (or fiber rail) to transmit information from a first node to a second node.

The optical couplers 306, 307 are coupled to the main and redundant pumps 301 to 304 to receive optical power and to distribute the power to Fiber 1 and Fiber 2.

In some implementations, at least one of the redundant pumps (e.g., redundant pump 304) is a Raman pump that injects optical power in a backward direction into both fibers. The above discussed power sharing technique can further be extended to configurations that use more than two optical fibers for communication from a first node to a second node. In such configurations, the savings afforded through elimination of redundant pumps are further increased. For example, in a configuration that uses 20 fiber channels in one direction, a minimum of 20 redundant pumps can be eliminated. It is thus evident that the disclosed techniques greatly reduce the cost of deployment and utilization of optical networks.

The disclosed technology can be implemented in, for example, the telecommunication C-band that spans the 1530-1565 nm range of wavelengths.

Figure 4:
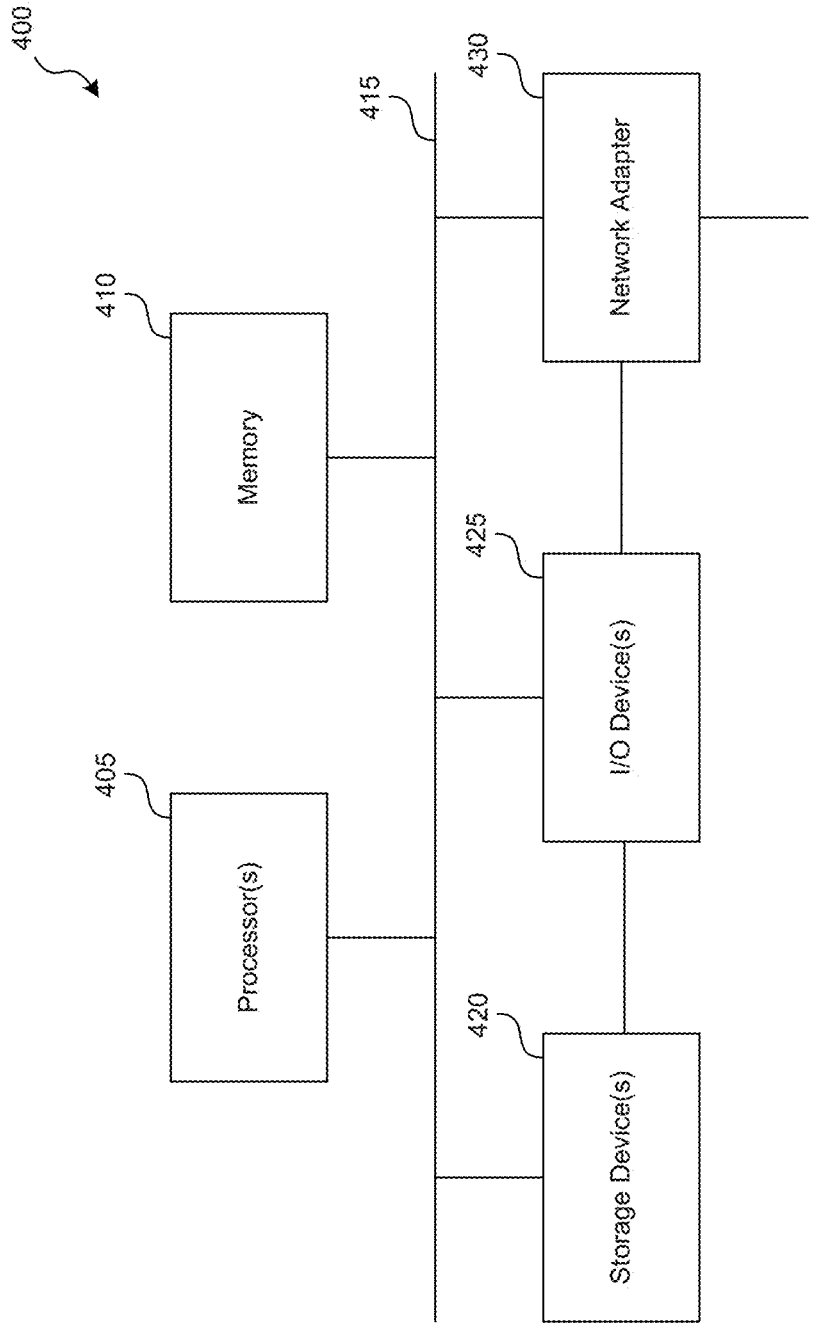
FIG. 4 is a block diagram of a computing device, consistent with various embodiments.

Operations and management of the disclosed components, including the pumps and amplifiers can be implemented under the control of one or more computing devices. FIG. 4 is a block diagram of a such computing system, consistent with various embodiments. The computing system 400 may include one or more central processing units ("processors") 405, memory 410, input/output devices 425 (e.g., keyboard and pointing devices, display devices), storage devices 420 (e.g., disk drives), and network adapters 430 (e.g., network interfaces) that are connected to an interconnect 415. The interconnect 415 is illustrated as an abstraction that represents any one or more separate physical buses, point to point connections, or both connected by appropriate bridges, adapters, or controllers. The interconnect 415, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 410 and storage devices 420 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 410 can be implemented as software and/or firmware to program the processor(s) 405 to carry out actions described above. In some embodiments, such software or firmware may be initially provided to the processing system 400 by downloading it from a remote system through the computing system 400 (e.g., via network adapter 430).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. An optical communication network, comprising:
    a first node coupled to a first optical channel and to a second optical channel, the first optical channel formed as part of a first optical fiber and the second optical channel formed as part of a second optical fiber;
    a second node coupled to the first optical channel and to the second optical channel and configured to receive optical signals from the first node through both the first and the second optical channels;
    a first optical amplifier coupled to the first optical fiber;
    a second optical amplifier coupled to the second optical fiber;
    a coupler including:
        an input coupled to a first pump,
        a first output coupled to the first optical amplifier, and
        a second output coupled to the second optical amplifier;
    the first pump coupled to the coupler to provide optical power to the first optical fiber; and
    a second pump coupled to the coupler to provide optical power to both the first and the second optical fibers via the first optical amplifier and the second amplifier that are both coupled to the coupler, wherein the first optical fiber powered via the coupler carries the first optical channel between the first node and the second node, the second optical fiber powered via the coupler carries the second optical channel between the same first node and the second node, and the first optical channel is independent from the second optical channel.

2. The optical communication network of claim 1, further comprising a third pump to provide optical power to the second optical fiber.

3. The optical communication network of claim 2, wherein the first and the third pumps are configured to operate as main optical pumps and the second pump is configured to operate as a redundant pump.

4. The optical communication network of claim 1, wherein the first optical amplifier is an Erbium-doped fiber amplifier (EDFA).

5. The optical communication network of claim 1, configured to operate in a wavelength range of 1530 to 1565 nm.

6. The optical communication network of claim 1, wherein the second pump is a Raman pump configured to inject optical power into both the first optical fiber and the second optical fiber in a reverse direction pointing from the second node to the first node.

7. The optical communication network of claim 1, wherein one or both of the first or the second pumps operate at a nominal wavelength of 980 nm.

8. The optical communication network of claim 1, further comprising:
    a third optical fiber including a third optical channel, wherein the second node is configured to receive optical signals from the first node through the first optical channel, the second optical channel and the third optical channel;
    a third pump configured to provide optical power to the third optical fiber as a main pump; and
    a fourth pump configured to operate as a redundant pump, wherein the fourth pump is configured to provide optical power to the second and to the third optical fibers.

9. The optical communication network of claim 1, further comprising a computing device including one or more processors and non-transitory computer readable media for storing processor executable instructions.

10. The optical communication network of claim 1, further comprising an additional optical fiber configured to enable communications from the second node to the first node.

11. An optical power arrangement for use in a fiber optical communication network, comprising:
    a first and a second optical fiber both configured to communicate data in a first direction;
    a first optical pump coupled to the first optical fiber;
    a second optical pump coupled to the second optical fiber;
    a third optical pump coupled to both the first and the second optical fibers to enable delivery of power to both the first and the second optical fibers, wherein the third optical pump is a Raman pump configured to inject optical power into both the first and the second optical fibers in a second direction opposite to the first direction;
    a third optical fiber including a third optical channel;
    a fourth pump configured to provide optical power to the third optical fiber as a main pump; and
    a fifth pump configured to operate as a redundant pump, wherein the fifth pump is configured to provide optical power to the second and the third optical fibers.

12. The optical power arrangement of claim 11, comprising one or more couplers configured to couple optical power from the first, the second or the third optical pumps to one or both of the first or the second fibers.

13. The optical power management of claim 11, comprising a first optical amplifier coupled to the first optical fiber and configured to receive optical power from the first optical pump and to enable amplification of optical signals in the first direction.

14. The optical power management of claim 11, comprising a second optical amplifier coupled to the second optical fiber and configured to receive optical power from the second optical pump and to enable amplification of optical signals in the first direction.

15. The optical power management of claim 14, wherein each of the first and the second optical amplifiers is an Erbium-doped fiber amplifier (EDFA).

16. The optical power management of claim 11, configured to operate in a wavelength range of 1530 to 1565 nm.

17. The optical power management of claim 11, further comprising an additional optical fiber configured to enable communications in the second direction.

18. An optical communication network, comprising:
    a first optical amplifier coupled to the first optical fiber, wherein a first node is coupled to a first optical channel and to a second optical channel, the first optical channel is carried by the first optical fiber and the second optical channel is carried by a second optical fiber, and a second node is coupled to the first optical channel and to the second optical channel and configured to receive optical signals from the first node through both the first and the second optical channels;
    a second optical amplifier coupled to the second optical fiber;

a coupler including:
  an input coupled to a first pump,
  a first output coupled to the first optical amplifier, and
  a second output coupled to the second optical amplifier;
the first pump coupled to the coupler to provide optical power to the first optical fiber; and
a second pump coupled to the coupler and configured to provide optical power to both the first and the second optical fibers via the first optical amplifier and the second amplifier that are both coupled to the coupler, wherein the first optical fiber powered via the coupler carries the first optical channel between the first node and the second node, the second optical fiber powered via the coupler carries the second optical channel between the same first node and the second node, and the first optical channel is independent from the second optical channel.

19. The optical communication network of claim 18, further comprising a third pump to provide optical power to the second optical fiber, wherein the first and the third pumps are configured to operate as main optical pumps and the second pump is configured to operate as a redundant pump.

20. The optical communication network of claim 1, further comprising:
  a third optical fiber including a third optical channel, wherein the second node is configured to receive optical signals from the first node through the first optical channel, the second optical channel and the third optical channel;
  a third pump configured to provide optical power to the third optical fiber as a main pump; and
  a fourth pump configured to operate as a redundant pump.

* * * * *